(12) United States Patent
Qiu et al.

(10) Patent No.: US 7,797,393 B2
(45) Date of Patent: Sep. 14, 2010

(54) SHARED STORAGE NETWORK SYSTEM AND A METHOD FOR OPERATING A SHARED STORAGE NETWORK SYSTEM

(75) Inventors: Qiang Qiu, Singapore (SG); Jit Biswas, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 982 days.

(21) Appl. No.: 10/585,578

(22) PCT Filed: Jan. 8, 2004

(86) PCT No.: PCT/SG2004/000009

§ 371 (c)(1),
(2), (4) Date: Nov. 6, 2006

(87) PCT Pub. No.: WO2005/066830

PCT Pub. Date: Jul. 21, 2005

(65) Prior Publication Data

US 2009/0094380 A1   Apr. 9, 2009

(51) Int. Cl.
*G06F 15/167* (2006.01)
(52) U.S. Cl. .................... 709/213; 709/212; 709/214; 709/215; 711/149; 711/202; 711/203
(58) Field of Classification Search .............. 709/212, 709/213, 214, 215; 711/149, 202, 203
See application file for complete search history.

(56) References Cited

U.S. PATENT DOCUMENTS 6,898,670 B2 * 5/2005 Nahum ................... 711/114

(Continued)

FOREIGN PATENT DOCUMENTS

| WO | WO 02/069159 A1 | 9/2002 |
|----|-----------------|--------|
| WO | WO 03/027886 A1 | 4/2003 |

OTHER PUBLICATIONS

Kubiatowicz et al., "OceanStore: An Architecture for Global-Scale Persistent Storage," ASPLOS 2000, Cambridge, Massachusetts, pp. 1-12.

(Continued)

*Primary Examiner*—Shawki S Ismail
(74) *Attorney, Agent, or Firm*—Foley & Lardner LLP

(57) ABSTRACT

A shared storage network system comprises at least one storage client and a plurality of storage servers, each providing a storage portion of the shared storage network system, each storage portion being divided into a plurality of sectors, each sector being divided into a plurality of blocks, a virtual block identifier being associated to each of the blocks such that the entirety of all of the virtual block identifiers of the blocks form a global block address space in which each of the virtual block identifiers is unique. The plurality of storage servers and the at least one storage client are grouped into a plurality of local area networks interconnected with preferred optical channels to form a global network. The at least one storage client is adapted to have read and/or write access to at least one block of at least one of the storage portions associated to one of the local area networks which differs from the local area network of the storage client. The plurality of local area networks are interconnected such that in case of a read or a write access of one of the at least one storage client to at least one of the blocks, the virtual block address of a block to which access is desired is translated into a physical block address to identify the physical block associated with the virtual block. The shared storage network system is further adapted to implement a storage data transmission scheme comprising an optical burst mode flow control and an optical stop-over burst transmission method.

19 Claims, 4 Drawing Sheets

U.S. PATENT DOCUMENTS

| | | | |
|---|---|---|---|
| 7,124,274 B2 * | 10/2006 | Watt et al. | 711/202 |
| 7,171,539 B2 * | 1/2007 | Mansell et al. | 711/203 |
| 7,669,029 B1 * | 2/2010 | Mishra et al. | 711/170 |
| 2003/0093541 A1 | 5/2003 | Loyayekar et al. | |
| 2003/0110263 A1 * | 6/2003 | Shillo | 709/226 |
| 2003/0140210 A1 | 7/2003 | Testardi | |

OTHER PUBLICATIONS

Rowstron et al., "Storage management and caching in PAST, a large-scael persistent peer-to-peer storage utility," SOSP—18, Nov. 2001, Canada, 13 pgs.

Stoica et al., "Chord: A Scalable Peer-to-peer Lookup Service for Internet Applications," SIGCOMM '01, Aug. 27-31, 2001, pp. 1-12.

SNIA, Shared Networking Industry Association, "Shared Storage Model: A framework for describing storage architectures," Jun. 5, 2001, 41 pgs.

* cited by examiner

SHARED STORAGE NETWORK SYSTEM AND A METHOD FOR OPERATING A SHARED STORAGE NETWORK SYSTEM

This application is a National Stage application of PCT/SG2004/000009, filed Jan. 8, 2004. The entire contents of the aforementioned application is incorporated herein by reference.

BACKGROUND OF THE INVENTION

1. Field of the Invention

The present invention relates to a shared storage network system and to a method for operating a shared storage network system.

2. Description of the Related Art

The improvement of computer storage devices, e.g. hard disk, and of computer storage management is a main issue in the development of computer technology.

According to the so-called OceanStore system disclosed in [1], a utility infrastructure is designed to span the globe and provide continuous access to persistent information. Since this infrastructure is comprised of untrusted servers, data is protected through redundancy and cryptographic techniques. OceanStore objects are identified by a globally unique identifier (GUID), which is the secure hash (SHA-1) of the owner's key and some human-readable name.

In the following, the data storing according to the OceanStore concept will be described.

Objects are replicated and stored on multiple servers. A replica from an object is located through one of two routing mechanisms. Objects in the OceanStore are modified through updates. In principle, every update to an OceanStore object creates a new version. OceanStore objects exist in both active and archival forms. An active form of an object is the latest version of its data together with a handle form update. An archival form represents a permanent read-only version of the object.

Routing is realized according to the OceanStore system as described in the following.

There are two routing algorithms co-existing in the OceanStore system. In the first fast, probabilistic routing algorithm, if a query cannot be satisfied by a server, local information is used to route the query to a likely neighbour. In the second slower, reliable hierarchical method, every server in the system is assigned a random node-ID. These node-IDs are then used to construct a mesh of neighbour links. Each link is labelled with a level number that denotes the stage of routing that uses this link. The $N^{th}$ level links-links for some Node X point at the sixteen closest neighbours whose node-IDs match the lowest N-1 nibbles of Node X's ID and who have different combinations of the $N^{th}$ nibble. Each object is mapped to a single node whose node-ID matches the object's GUID in the most bits, this node may be called the object's root. If information about the GUID was stored at its root, then anyone could find this information simply by following neighbour links until they reached the root node for the GUID.

Security features are provided by the OceanStore system, as described in the following.

To prevent unauthorized reads, all data are encrypted in the system that is not completely public and the encryption key is distributed to those users with read permission ("restricting readers"). To revoke read permission, the owner requests that replicas to be deleted or re-encrypted with the new key. A recently-revoked reader is still able to read old data from cached copies or from misbehaving servers.

To prevent unauthorized writes, all writes are required to be signed so that well-behaved servers and clients can verify them against an access control list (ACL), so-called "restricting writers".

In [2], the so-called "PAST" system is disclosed.

PAST is based on a self-organizing, Internet-based overlay network of storage nodes that cooperatively route file queries, store multiple replicas of files and cache additional copies of popular files.

The naming features of PAST will be described in the following.

Storage nodes and files are each assigned uniformly by a distributed identifier. A 160-bit fileID is computed as the secure hash (SHA-1) of the file's name, the owner's public key and a randomly chosen salt. Each PAST node is assigned a 128-bit node identifier. The nodeID assignment is quasi-random (e.g., SHA-1 of the node's public key). The statistical assignment of files to storage nodes approximately balances the number of files stored on each node. However, non-uniform storage node capacities and file size require more explicit storage load balancing.

Routing is realized according to PAST, as explained in the following.

PAST routes an associated message towards the node whose nodeID is numerically closest to the 128 msbs of the fileID among all live nodes. NodeIDs and fileIDs are considered as a sequence of digits with base $2^b$. A node's routing table is organized into $[\log_{2^b} N]$ levels with $2^b-1$ entries each. The $2^b-1$ entries at level n of the routing table each refer to a node whose nodeID shares the present node's nodeID in the first n digits, but whose $(n+1)^{th}$ digit has one of the $2^b-1$ possible values other that the n+1 digit in the node's ID. Each node maintains IP address for the nodes in routing table.

PAST provides security features, as explained below.

Each PAST node and each user of the system holds a smart-card (read-only clients do not need a card). A private/public key pair is signed with smartcards issuer's private key for certification purposes.

[3] discloses the so-called Chord system.

The Chord File System (CFS) is a peer-to-peer read-only storage system. CFS servers provide a distributed hash table (Dhash) for block storage. CFS clients interpret Dhash block as a file system. Dhash distributes and caches blocks at a fine granularity to achieve load balance, uses replication for robustness and decreases latency with server selection. Dhash finds blocks using the Chord location protocol, which operates in time logarithmic in the number of servers.

Naming is realized by the Chord system as follows.

Each Chord node has a unique m-bit node identifier (ID) obtained by hashing the node's IP address and a virtual node index. Chord views the IDs as occupying a circular identifier space. Keys are also mapped into this ID space, by hashing them to m-bit key IDs. Chord defines the node responsible for a key to be the "successor" of that keys ID. The successor of an ID j is the node with the smallest ID that is greater than or equal to j (with wrap-around). Chord assigns each server an identifier drawn from the same 160-bit identifier space as block identifiers. These identifiers can be considered as points on a circle. The mapping that Chord implements takes a block's ID and yields the block's successor, the server whose ID most closely follows the block's ID on the identifier circle. When a node n joins the network, certain keys previously assigned to n's successor become assigned to n. When node n leaves the network, all of n's assigned keys are reassigned to its successor.

Data storing is performed according to Chord, as explained in the following.

The publisher inserts the file system's blocks into the CFS system, using a hash of each block's content as its identifier. Then the publisher signs the root block into CFS using the corresponding public key as the root block's identifier. Dhash places a block's replicas at the k servers immediately after the block's successor on the Chord ring.

The Chord system performs routing as described in the following.

A Chord node uses two data structures to perform lookups: a successor list and a finger table. Only the successor list is required for correctness and the finger table accelerates lookups. Every Chord node maintains a list of the identities and IP addresses of its r immediate successors on the Chord ring. If the desired key is between the node and its successor, the latter node is the key's successor, otherwise the lookup can be forwarded to the successor, which moves the lookup strictly closer to its destination. A new node n learns of its successors when it first joins the Chord ring, by asking an existing node to perform a lookup for n's successor. Then, n asks that successor for its successor list.

As explained in the following, security features are included in the Chord system.

Clients name a file system using the public key. They can check the integrity of the root block using that key, and the integrity of blocks lower in the tree with the content-hash identifiers that refer to those blocks. CFS authenticates updates to root blocks by checking that the new block is signed by the same key as the old block. A timestamp prevents replays of old updates. CFS allows updates, but in a way that allows only the publisher of a file system to modify it. A CFS server will accept a request to store a block under either of two conditions. If the block is marked as a content-hash block, the server will accept the block if the supplied key is equal to the SHA-1 hash of the block's content. If the block is marked as a singed block, the block must be signed by a public key whose SHA-1 hash is the block's CFS key.

[4] is related to the SNIA (Storage Network Industry Association) standard which is a layer architecture for a network system of nodes sharing common memory resources.

SUMMARY OF THE INVENTION

It is an object of the present invention to provide a shared storage network system and a method for operating a shared storage network system which are capable of sharing storage of a computer system with increased efficiency and performance compared to the related art.

The object is achieved by providing a shared storage network system and a method (which in particular may include a storage data location scheme and a storage data transmission scheme) for operating a shared storage network system with the features according to the independent claims.

The shared storage network system according to the invention comprises a plurality of storage servers, each providing a storage portion of the shared storage network system, each storage portion being divided into a plurality of sectors, each sector being divided into a plurality of blocks, a virtual block identifier being associated to each of the blocks such that the entirety of all of the virtual block identifiers of the blocks form a global block address space in which each of the virtual block identifiers is unique. The shared storage network system further includes at least one storage client. The plurality of storage servers and the at least one storage client are grouped into a plurality of local area networks interconnected preferably with optical channels) to form a global network. The at least one storage client is adapted to have read and/or write access to at least one block of at least one of the storage portions associated to one of the local area networks which differs from the local area network of the storage client. Moreover, the plurality of local area networks are interconnected such that in case of a read or a write access of one of the at least one storage client to at least one of the blocks, the virtual block address of a block to which access is desired is translated into a physical block address to identify the physical block associated with the virtual block.

According to the invention, a method for operating a shared storage network system is provided, the shared storage network system comprising at least one storage client and a plurality of storage servers, each providing a storage portion of the shared storage network system, each storage portion being divided into a plurality of sectors, each sector being divided into a plurality of blocks, a virtual block identifier being associated to each of the blocks such that the entirety of all of the virtual block identifiers of the blocks form a global block address space in which each of the virtual block identifiers is unique. The shared storage network system operated by the method of the invention further comprises a plurality of local area networks, wherein the plurality of storage servers and the at least one storage client are grouped into the plurality of local area networks interconnected (preferably with optical channels) to form a global network. The method comprises the step of adapting the at least one storage client to have read and/or write access to at least one block of at least one of the storage portions associated to one of the local area networks which differs from the local area network of the storage client, and the step of interconnecting the plurality of local area networks such that in case of a read or a write access of one of the at least one storage client to at least one of the blocks, the virtual block address of a block to which access is desired is translated into a physical block address to identify the physical block associated with the virtual block.

A basic idea of the invention can be seen in that storage portions of a plurality of remote storage servers (i.e. storage providing nodes of the network) mutually form a huge global storage which can be accessed by one or more storage clients (i.e. storage consuming nodes), from a remote position in the global network. An important aspect is that, from a point of view inside of a local area network including one of the storage servers, the storage portion which is divided into sectors which in term are divided into blocks, each block can be identified by a physical block address. However, on the level of the shared storage network system, each block of each storage server has a unique virtual block address within a single global block address space, so that an ID is associated to each storage block of the global system. To access a particular block of the global storage system, this unique virtual block address is appropriate to unambiguously address the desired block. However, according to the invention, a local to global address translation is performed to derive the (local) physical block address of a particular block from its (global) virtual block address, or vice versa. This efficient local to global block address translation can also equip a shared storage system with the capability of achieving load balancing and data location hiding. The invention provides a virtual to physical block address mapping scheme. By this teaching, a system is provided which enables very easy access from each storage consuming node to each storage portion of each storage providing node. Thus, common storage resources can be shared very efficiently. The plurality of local area networks (LAN) are coupled to share storage (or memory) resources in a sophisticated manner as a consequence of the advantageous address management of the invention.

The provided efficient virtual to physical block mapping scheme can enable the native storage load balancing and data location hiding. The provided storage data transmission scheme can enable the flexible sharing and high utilization of the optical channel for the I/O generated traffic to support a high-volume shared storage oven large scale networks.

In other words, a globally addressable storage system is provided with a global network, preferably an optical network, as the interconnection network to support the shared storage system over a large scale distributed network at low cost. An optical burst mode flow control and an optical stopover burst transmission scheme may be implemented to makes use of optical burst switching in an advantageous manner through dynamic connection setup and release to increase optical networks utilization greatly to make it suitable for the shared storage system, particularly in WAN (wide area network) or MAN (metropolitan area network) context. An optical burst mode flow control algorithm and an optical stop-over burst transmission scheme adopted in the shared storage network system are provided in order to closely couple I/O requests with light path setup. This enables flexible sharing and high utilization of the optical channel. The proposed block address scheme can natively enable system load balancing and data location hiding. Local to global block address translation may be performed by a linking computer, a distributed block address translation server (BATS). This enables any local-oriented networked storage protocol, e.g., Fiber-Channel SAN, go to wide area.

The shared storage system which may also be denoted as globally addressable storage system, preferably operates on a layer II (block layer) solution of the SNIA shared storage model which is discussed in [4]. The global (preferably optical) network as the interconnection network supports the shared storage system over a large scale of distributed networks (LANs) at low cost. A main idea of the shared storage system of the invention is to provide a huge virtual storage with a single global block address space over networks, preferably optical networks. The idea is to pool sundry physical storage devices into a single logical storage which, according to a preferred embodiment, can be allocated dynamically. No longer will a server appear to be down when storage is being reconfigured due to the interconnection scheme of the invention.

The shared storage system of the invention has a very simple and symmetric architecture. It may make use of optical burst switch in an improved or optimal manner through dynamic connection setup and release to increase optical networks utilization greatly to make it suitable for the shared storage system in WAN or MAN context. The optical burst mode flow control algorithm and optical stop-over burst transmission scheme adopted in the system may be introduced to couple an I/O request with light path setup tightly to enable the flexible sharing and high utilization of the optical channel. A distributed block address translation server (BATS) may be implemented to perform the local to global block address translation. It could help any local-oriented networked storage protocol, e.g., Fiber-Channel SAN, go to wide area. Lots of functions can also be provided by the BATS, such as data hiding, simple access control and so on.

Each block in the shared storage system is globally identified by a global block address. So the whole shared storage system is like a huge storage with a single block address space. The system of the invention is not designed only for the typical storage applications, such as disaster recovery and backup. It meets the storage requirement from those applications related to computability in large distributed system, for example, the E-Science applications requiring quite large storage address space. Through the provided data location scheme, the storage client can choose to randomly place the data in the system without degrading the performance to achieve the data location hiding and load balancing. An optical burst mode flow control method and an optical stopover burst transmission method together enable the flexible sharing and high utilization of the optical channels in the global network system of the invention. With such methods, traffic generated by an I/O operation, which originally could lead to poor bandwidth utilization in the optical domain due to the traffic nature, could be efficiently transmitted through the optical networks with QoS (Quality of Service) support.

The invention teaches a shared storing system comprising a plurality of LANs which are interconnected by a network system, preferably an optical network system. Each LAN comprises one or more nodes (storage server, storage client) comprising a storage source (storage server) providing storage resource to the shared storing system and/or a storage consumer (storage client) consuming storage from the shared storing system. Each storage resource is divided into sectors, each sector being divided into blocks. Each storage client can access the storage sources of one or more remote storage servers. Storage resources provided by the storage sources of the shared storing system form a single global block address space in which each block is identified by a virtual block ID. For a communication between a storage consumer and a storage source (i.e. read or write requests concerning data stored or to be stored in a remote storage portion), a local to global block address translation is carried out, i.e. a particular virtual block ID of a block to which access is desired is translated to a physical block ID to identify the physical block associated with the virtual block.

In the following, preferred embodiments of the invention are described.

Preferably, the global network of the shared storage network system is an optical network. According to this embodiment, the invention makes use of the high data transmission velocity of an optical network so that the efficient address scheme of the invention can be implemented in an advantageous manner.

At least one of the local area networks may comprise a linking computer being interconnected as a link between the at least one storage server and/or the at least one storage client of the local area network associated with the linking computer on the one hand and the remaining local area networks on the other hand. Such a linking computer associated to a particular LAN may provide interface services required at the interface between LAN and the global network.

The linking computer can be adapted to perform the translation of a virtual block address of a block to which access is desired into the physical block address of this block. In other words, the resources for realizing the local to global address translation may be included in the linking computer.

At least one of the local area networks may be an optical network or may be a wired network. Particularly, a part of the LANs may be realized as a conventional wired network, whereas another part of the LANs may be realized as an optical network.

The shared storage network system according to the invention may be adapted to operate based on the Storage Networking Industry Association (SNIA) standard. Particularly, an implementation of the system of the invention in the block layer (layer II) of the SNIA shared storage model is advantageous.

A unique computer identifier can be associated to each storage server and/or to each storage client and/or to each linking computer of each of the local area networks. The unique computer identifier is preferably determined as a hash value, further preferably as a cryptographic hash value, e.g.

determined according to SHA-1, SHA-5 or the like. The hash can be based on the internet protocol address (IP address) of the computer and on a private key. Such a private key may be selected by a user of the system. By introducing such a hash value, security can be increased in the system of the invention.

The shared storage network system of the invention is preferably adapted such that a temporally varying attachment and detachment of storage servers and/or storage clients to the shared storage network system is enabled. In other words, the networked nodes of the shared storage system are not operated in a static manner, but it is possible that further clients or servers are added to the shared storage system, or that clients or servers are removed from the shared storage system.

Preferably, the shared storage network system of the invention is adapted such that routing, in case of a read or a write access communication between a storage client and a storage server, is implemented by a fully adaptive routing scheme adapted to find a global network-wide least-cost path. Particularly, the global network-wide least-cost path may be determined based on a dynamic link state and/or a custom-designed cost function.

Alternatively, the shared storage network system according to the invention can be adapted such that routing, in case of a read or a write access communication between a storage client and a storage server, is implemented by a partially adaptive routing scheme, according to which a plurality of alternate paths between a pair of a storage client and a storage server are stored in a routing table at the storage client and/or the storage server.

According to another alternative embodiment, the shared storage network system is adapted such that routing, in case of a read or a write access communication between a storage client and a storage server, is implemented by a static adaptive routing scheme, according to which one or more fixed alternate paths between a pair constituted by a storage client and a storage server are stored at the storage client and/or the storage server.

The shared storage network system can further be adapted such that, in case of a predetermined global network path for a read or a write access communication between a storage client and a storage server, one or more other storage clients and/or storage servers along said path are implemented as cache storage nodes for temporarily storing data transmitted according to the read or write access. If data are transmitted along a data path located between a storage client and a storage server, intermediate computers along said path may provide the functionality of temporarily storing the data to be transmitted. Thus, a loss of data can be avoided in a scenario in which data transmission is not performed properly.

Moreover, the shared storage network system can be adapted such that the physical block address of each block comprises a non-deterministic physical block address to address the unique physical block mapping to a particular virtual block associated with a particular virtual block address, and a deterministic physical block address to address a unique physical block in the global network to determine the location of the associated physical block.

Further, the shared storage network system of the invention may be adapted to implement a storage data transmission scheme comprising an optical burst mode flow control and an optical stop-over burst transmission method. This configuration enables flexible sharing and high utilization of an optical channel for I/O generated traffic.

Summarizing, a key aspect of the invention can be seen in the storage data location scheme (virtual to physical block address mapping scheme). Another key aspect can be seen in the data transmission scheme (optical burst mode flow control and optical burst stop-over method). A further key aspect is directed to the combination of the above-mentioned two key aspects, i.e. their common implementation within one system.

Although the above and below embodiments are described referring to the shared storage system of the invention, these embodiments are of course also applicable to the method for operating a shared storage system of the invention.

The above and other objects, features and advantages of the present invention will become apparent from the following description and the appended claims, taken in conjunction with the accompanying drawings in which like parts or elements are denoted by like reference numbers.

BRIEF DESCRIPTION OF THE DRAWINGS

The accompanying drawings, which are included to provide a further understanding of the invention and constitute a part of the specification illustrate embodiments of the invention.

In the drawings.

DETAILED DESCRIPTION OF PREFERRED EMBODIMENTS OF THE INVENTION

In the following, the SNIA (Storage Network Industry Association) standard, which is preferably included in the network architecture of the shared storage network system of the invention, will be described referring to FIG. 1.

SNIA is a layer architecture for a network system of nodes sharing common storage resources.

Similar to the OSI 7-layer model in conventional networking, the SNIA Shared Storage Model describes common storage architectures. The layer structure according to the SNIA standard is illustrated in FIG. 1. In other words, the layering scheme of the SNIA Shared Storage Model is visualized in FIG. 1.

Figure 1:
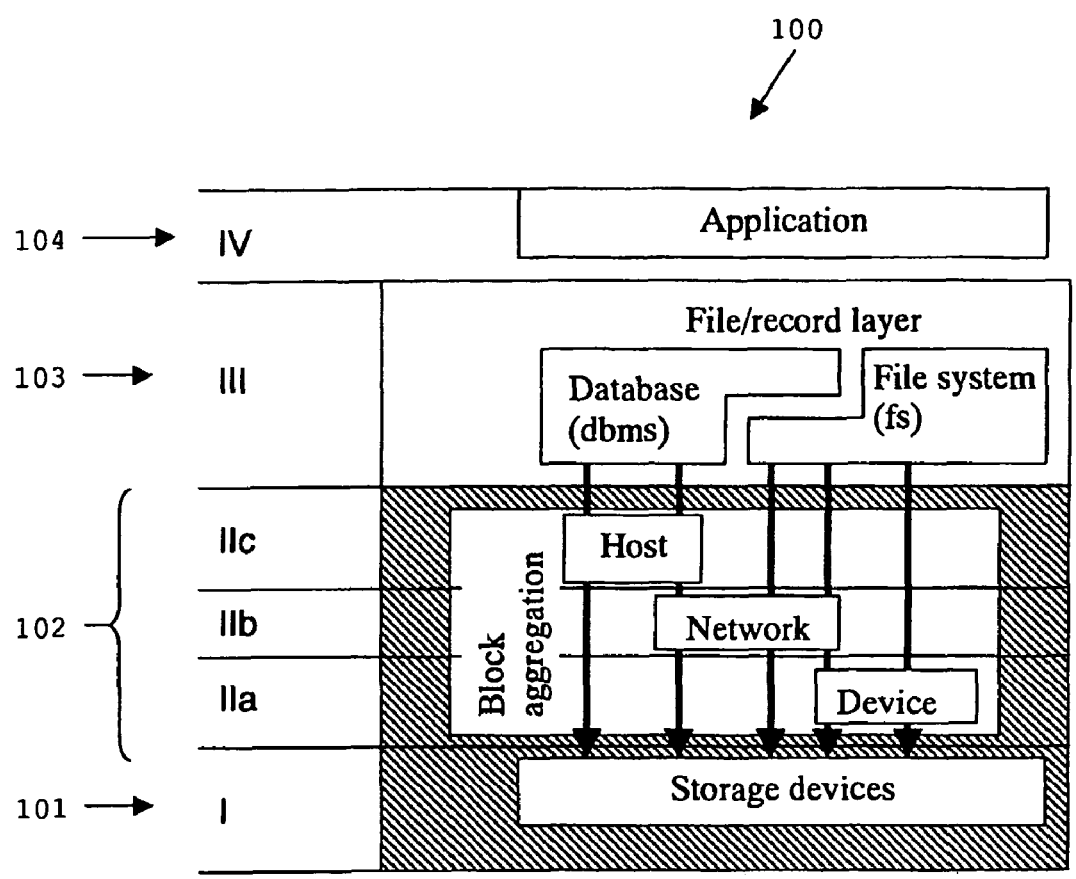
FIG. 1 shows schematically the layer structure according to the Storage Networking Industry Association (SNIA) standard.

According to the SNIA layer model 100 shown in FIG. 1, there is provided a layer I 101 representing the level of storage devices of a storage network. Further, a level II 102 denotes a block layer representing host, network and devices and is thus subdivided into three sublayers IIa, IIb, IIc. Moreover, a layer III 103 is provided as a file/record layer including database and file system and it thus subdivided into two sublayers IIIa, IIIb. Beyond this, a level IV 104 is provided as an application layer.

In the following, layer III 103, the file/record layer, of the SNIA layer model 100 will be described in more detail.

Layer III 103 packs small things such as files (byte vectors) and database tuples (records) into larger entities such as block-level volumes and storage device logical units.

The two common implementations seen at level III 103 are database management systems and file systems. Both provide mechanisms for naming or indexing files or records, enforcing access controls, performing space allocation and clustering, and caching data for rapid access. In both cases, the file/record layer is located on top of one or more volumes: large block-vector stores or byte-vectors provided by an underlying block store or (sometimes) file system.

The functions provided by the file/record layer can be implemented in several different places:

solely in the host: these are the traditional host-based file systems and databases. In such systems, the implementation of the file system or database resides completely in the host, and the interface to the storage device is at the block-vector level.

in both client and server: these are the standard "network" file systems such as NFS (Network File System), CIFS (Common Internet File System), etc. Such implementations split their functions between the client (host) and the server system.

In the following, layer II 102, namely the block layer, of the SNIA layer model 100 will be described.

The block layer provides low-level storage to higher layers, typically with an access interface that supports one or more linear vectors of fixed-size blocks.

Ultimately, data is stored on "native" storage devices such as disk drives, solid-state disks, and tape drives. These devices can be used directly, or the storage they provide can be aggregated into one or more block vectors to increase or decrease their size, or provide redundancy.

Secondary responsibilities of the block layer include a simple form of naming, such as SCSI Logical Unit Names (LUNs), caching (and, in particular, non-volatile caches for write-behind data), and (increasingly) simple access control.

Block aggregation comprises a powerful set of techniques that are used to serve many purposes. These include:

space management: constructing a large block vector by assembling several smaller ones, or packing many small block vectors into one large one, or both.

striping: apportioning load across several lower-level block vectors and the systems that provide them. The typical reason for doing this is to increase throughput by increasing the amount of parallelism available; a valuable secondary benefit may be the reduction in average latency that can result as a side effect.

Providing redundancy for increasing availability in the face of storage device failures. This can be full redundancy (e.g., local & remote mirroring, RAID-1, -10 . . . ), or partial redundancy (RAID-3, -4, -5, . . . ). Additional features like point-in-time copy can be provided, which can be used to increase the effective redundancy level of a system, and to assist recovery from other kinds of failures.

Figure 2:
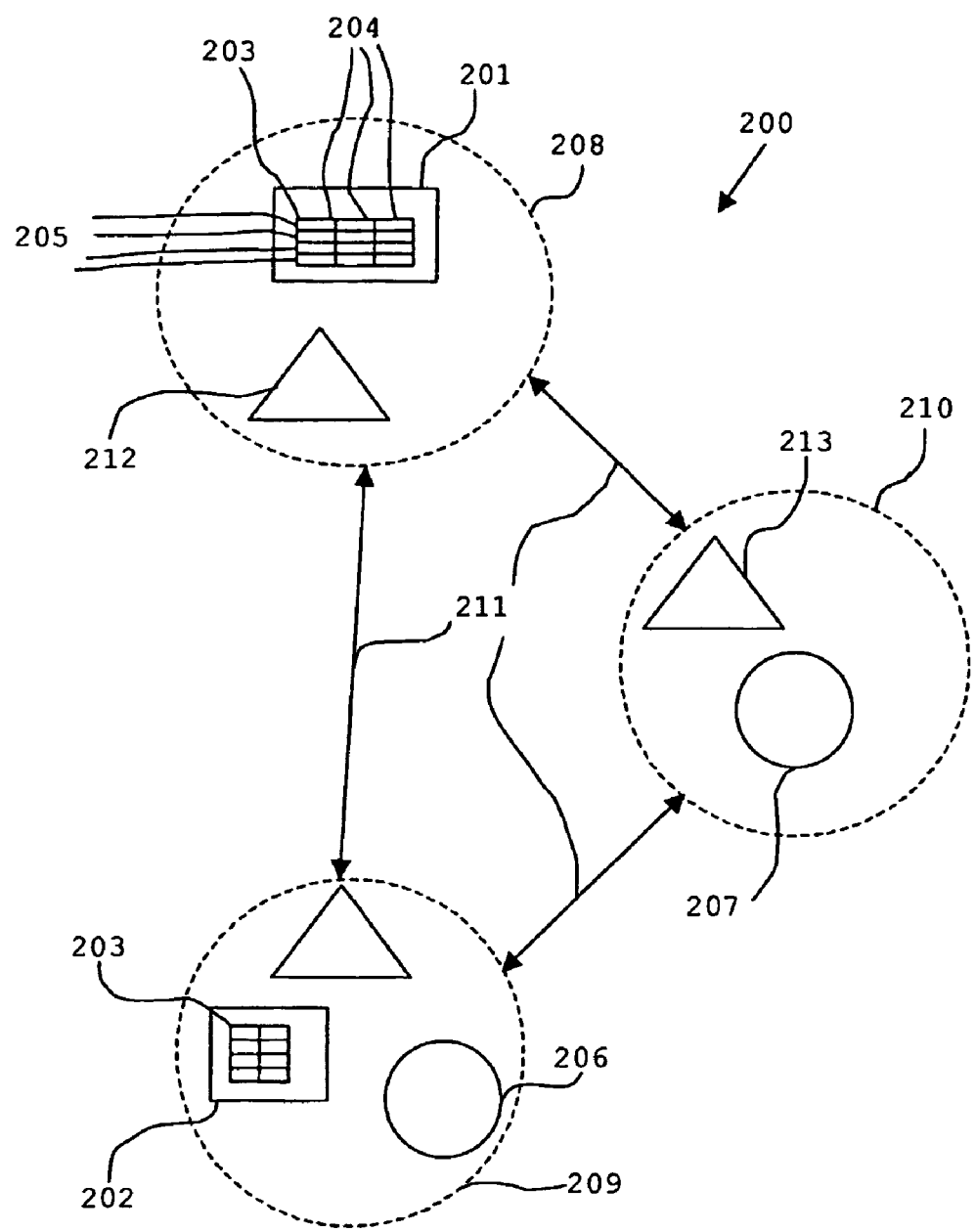
FIG. 2 shows a shared storage network system according to a preferred embodiment of the invention.

Referring to FIG. 2, a shared storage network system 200 according to a preferred embodiment of the invention will be explained.

The shared storage network system 200 comprises a first storage server 201 and a second storage server 202 functioning as storage providing nodes, each providing a storage portion 203 of the shared storage network system 200. Each storage portion 203 of the first storage server 201 and of the second storage server 202 is divided into a plurality of sectors 204 (shown in FIG. 2 schematically as columns of a matrix), each sector 204 being divided into a plurality of blocks 205 (shown in FIG. 2 schematically as elements of the matrix at each intersection of a matrix column and a matrix row). A virtual block identifier is associated to each of the blocks 205 such that the entirety of all of the virtual block identifiers of the blocks 205 form a global block address space in which each of the virtual block identifiers is unique.

The shared storage network system 200 further comprises a first storage client 206 and a second storage client 207 each functioning as storage consuming nodes.

The storage servers 201, 202 and the storage clients 206, 207 are grouped into first to third local area networks 208 to 210 interconnected to form a global optical network 211.

Each of the storage clients 206, 207 is adapted to have read and write access to each block 205 of each of the storage portions 203. Particularly, the storage clients 206, 207 have access to storage provided by storage portions 203 related to a LAN 208 to 210 which is located remote (i.e. associated to a remote LAN) from the demanding storage client 206, 207.

Thus, if one of the storage clients 206, 207 needs some storage resource, this storage client 206, 207 can access the storage provided by the storage servers 201, 202, i.e. can write data to the storage of the storage servers 201, 202 and can read the information from there.

The first to third local area networks 208 to 210 are interconnected such that in case of a read or a write access of one of the storage clients 206, 207 to at least one of the blocks 205, the virtual block address of a block 205 to which access is desired is translated into a physical block address to identify the physical block associated with the virtual block.

The first local area network 208 comprises a first linking computer 212 being interconnected as a link between the first storage server 201 of the first local area network 208 associated with the first linking computer 212 on the one hand and the remaining local area networks 209, 210 on the other hand. In a similar manner, the third local area network 210 comprises a second linking computer 213 being interconnected as a link between the second storage client 207 of the third local area network 210 associated with the second linking computer 213 on the one hand and the remaining local area networks 208, 209 on the other hand.

The linking computers 212, 213 each are adapted to perform the translation of a virtual block address of a block 205 to which access is desired into the physical block address of this block 205.

Figure 3:
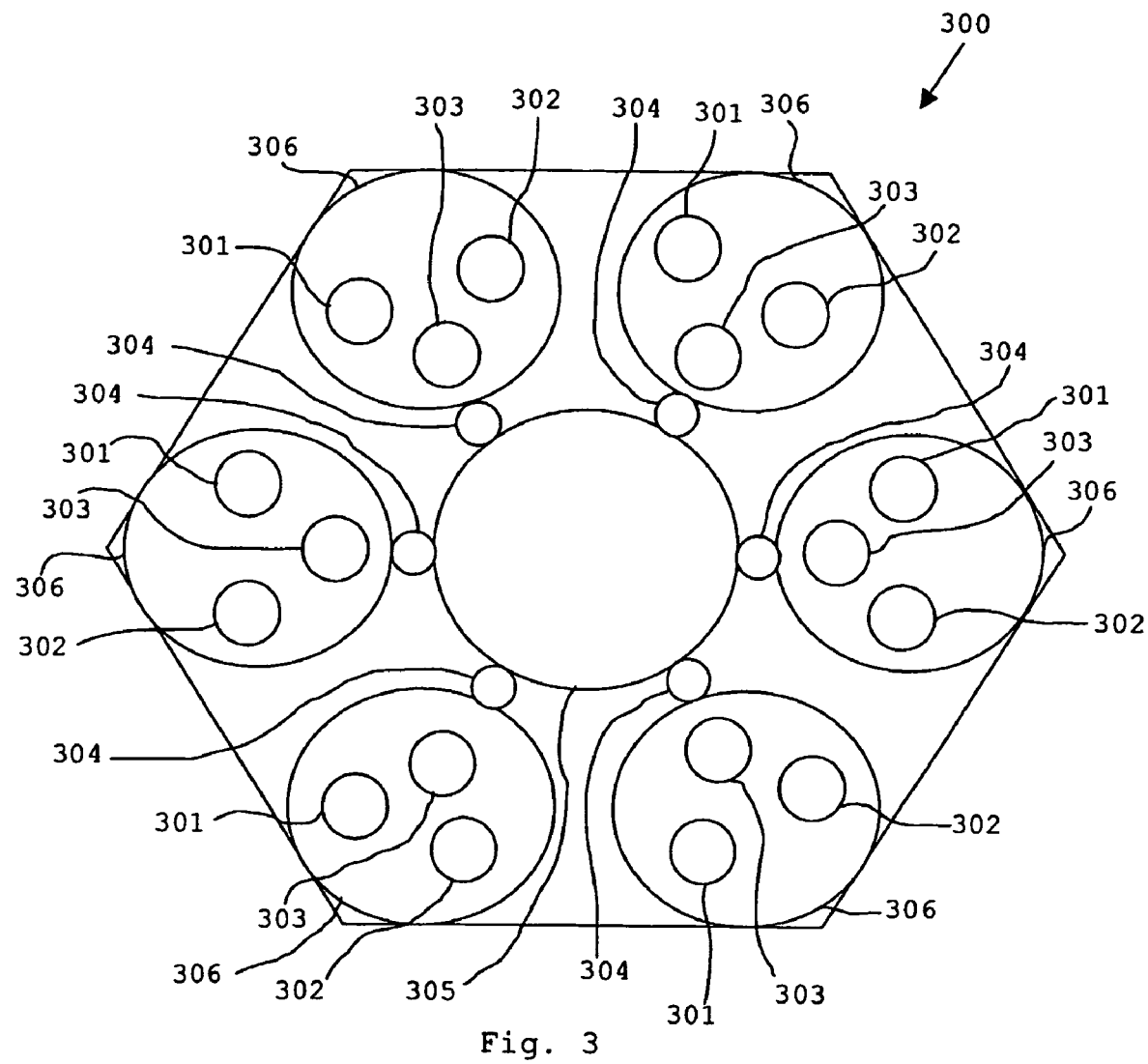
FIG. 3 shows a shared storage network system according to another preferred embodiment of the invention.

Referring to FIG. 3, a shared storage network system 300 according to another preferred embodiment of the invention will be explained.

Compared to the shared storage network system 200 shown in FIG. 2, the shared storage network system 300 shown in FIG. 3 is more symmetric. The shared storage network system 300 is constituted by a plurality of local area networks 306 interconnected by an optical domain network 305. Each local area network 306 comprises a first storage server 301 and a second storage server 302 as storage providing nodes, and a storage client 303 as a storage consuming node. The link between nodes 301 to 303 of each LAN 306 and the optical domain 305 is performed by a linking computer 304 associated to each LAN 306.

Figure 4:
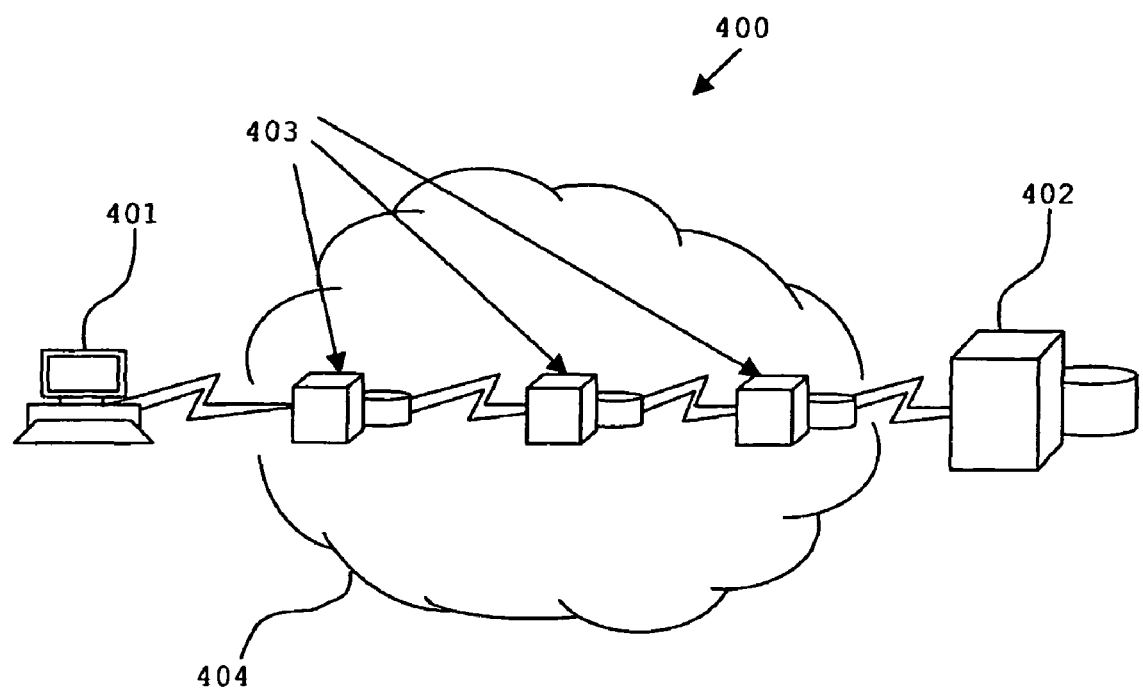
FIG. 4 shows a data path along which data are transferred between a source computer and a destination computer via an intermediate computer, according to a preferred embodiment of the invention.

Referring to FIG. 4, an optical data path 400 will be described, along which data are transferred between a storage client 401 and a storage server 402 via a plurality of intermediate cache server computers 403, according to a preferred embodiment of the invention. In other words, FIG. 4 shows the optical burst stop-over method, which is one of the key aspects of the invention FIG. 4 shows a scenario in which data are transmitted in a shared storage network system of the invention. Data are transmitted from the storage client 401 to the storage server 402 via an optical network 404. Along the data transmission path 400, a plurality of computers are located functioning as cache server computers 403. The cache server computers 403 are adapted to temporarily store data to be transmitted between the storage client 401 and the storage server 402.

In the following, a detailed overview of structure and functionality of embodiments of the system of the invention will be given.

In the shared storage network system of the invention, each node (i.e. storage server, storage client) could communicate with each other through both a data channel, which will be the optical links and a communication channel, which could be a low data rate channel, e.g. Ethernet or a dedicated optical channel.

A plurality of LANs interconnected to form the shared storage network system are provided, wherein storage servers and storage clients are included in the LANs. A linking computer (BATS) can further be included in any of the LANs acting as an interface between the nodes of the LAN and the global network, for example an optical domain.

Thus, based on the functionality difference, the nodes of the system can be classified into at least three categories: storage server, storage clients and linking computer (also denoted as block address translation server, BATS). A storage server node is a node to provide storage resource to the shared storage network system, e.g. a storage server from a Storage Area Network (SAN). A storage client node is a node to consume storage resource from the system, e.g. a computer host. It is possible for a node to act as both server and client to consume some storage from the system while also serving some storage to others. In addition to the storage server nodes and storage client nodes, an optional BATS node can take over most of the functionality from the server and client node and natively extent any local-oriented storage networking protocol, e.g. Fiber-Channel based SAN, to wide area for long distance data sharing.

Each node is assigned a unique 160-bit NodeID. The NodeID assignment is random without any dependency on, e.g. the node physical location, and also no node information should be able to be reconstructed from the NodeID. The neighbour of a node j is the node with the smallest ID that is greater than or equal to j (with wrap-around). Each node is associated with a public-private key pair. The NodeID could be computed as a secure hash (SHA-1) of node's IP address and the private key.

$$\text{NodeID}=\text{SHA-1}(\text{IPAddress}, \text{PrivateKey}) \tag{1}$$

In the following, the block address scheme of the invention will be described. This block address scheme is one of the key aspects of the invention.

While each block in the system could be addressed by a unique physical block address, that is, all blocks in the system share a single global block address space, each node also has it own virtual block address space. The virtual block address space at each node is divided into sectors. The size of each sector is decided at each node locally. The storage is normally allocated based on demand. A virtual block has significance when a physical block has been attached.

There are three types of block address schemes defined in the system. The first one is the Virtual Block Address, Virtual-BlockID, which is used to uniquely address a virtual block locally. The second one is the Non-Deterministic Physical Block Address, ND-Physical-BlockID, which is used to address that unique physical block mapping to a particular virtual block derived from the Virtual-BlockID although the location of such physical block has not be determined yet. The third one is the Deterministic Physical Block Address, Physical-BlockID, which is used to address a unique physical block in the system, and the location of such physical block is determined. A similar address scheme is also employed for a sector as Virtual-SectorID, ND-Physical-SectorID and Physical-SectorID. The size of a sector is denoted as SectorSize, and an offset value characterizing the sector is denoted as SectorOffset.

A Virtual Block Address is described by the equation:

$$\text{Virtual-BlockID}=\text{Virtual-SectorID}*\text{SectorSize}+\text{SectorOffset} \tag{2}$$

The Non-Deterministic Physical Block Address can be determined. A physical sector offset parameter PhysicalSectorOffset is introduced as $$\text{ND-Physical-BlockID}=\text{ND-Physical-SectorID}+\text{Physical-SectorOffset} \tag{3}$$

wherein $$\text{ND-Physical-SectorID}=\text{Neighbour}(\text{SHA-1}(\text{NodeID}, \text{Virtual-SectorID}, \text{PrivateKey})) \tag{4}$$

and $$\text{Physical-SectorOffset}=[\log_2 \text{SectorSize}]\text{LSB}(\text{SHA-1}(\text{SectorOffset}, \text{SectorSecretSeed})) \tag{5}$$

The Sector is the basic storage allocation unit. During the storage allocation operation, the ND-Physical-BlockID derived from a Virtual-BlockID will be used to generate the storage allocation request to the corresponding storage server node, and the returned Physical-BlockID will be used to globally identify the physical block associated with that virtual block. At a particular time, given a Virtual-BlockID, a unique physical block can be associated through the derived ND-Physical-SectorID by sending the SectorSize storage allocation request to the node with the NodeID ND-Physical-SectorID and returning the Physical-SectorOffset block of the allocated storage as the addressed block.

Due to the dynamic attaching of nodes to the system and detaching of nodes from the system, the neighbour of a particular node can change with time. The free resource at a server node is also changing with the time. Therefore, the exact physical block addressed by a ND-Physical-SectorID is varied in dependence of the time. The non-deterministic physical address scheme is only used before the real physical storage is allocated at a remote storage server node. After storage has been allocated, only the deterministic address will be used to address a particular physical block. However, by such non-deterministic address scheme, any virtual block address is guaranteed to have one and only one physical block associated even although the physical location of such block is still non-deterministic.

A block allocation operation BALLOC can be theoretically defined as $$\text{Physical-BlockID}=\text{BALLOC}(\text{ND-Physical-BlockID}, \text{ServiceParamerSet}) \tag{6}$$

However, due to the dynamic system re-configuration and the particular transmission manner available in the optical domain, it is expensive to perform the block-based operation for the storage allocation and also the I/O data transmission. Therefore, the sector-based operation is adopted. In the system of the invention, the data size used in both the storage allocation and I/O request should be in the unit of sector, e.g. the sector-based BALLOC could be defined as $$\text{Physical-SectorID}=\text{BALLOC}(\text{ND-Physical-SectorID}, \text{SectorSize}, \text{ServiceParamerSet}) \tag{7}$$

Based on equation (4), NodeID and Virtual-SectorID are used to determine ND-Physical-SectorID. Once a block operation has been issued on a virtual block without significance, BALLOC operation will direct a storage allocation request for SectorSize storage to the storage server node ND-Physical-SectorID by employing a system like the Chord routing method disclosed in [3] or the PAST routing method disclosed in [2]. If the server node requested is out of space or dedicated for some particular users, the request will be forwarded to the next neighbour till the allocation is granted. The IP address of the storage server node that grants the allocation request plus the first block Virtual-BlockID of the allocated storage at the server node will be returned as the global Physical-SectorID related to the allocated sector. All the following I/O operation on the virtual block Virtual-BlockID at the storage client node within this sector will directly operate on the physical block "Physical-SectorID+Physical-Sector-Offset". When a server node is going to detach from the system, all the system data storing on it need to be forwarded to its neighbour and all the client nodes attaching to it may be updated.

In order to reduce the storage allocation delay during translating the ND-Physical-BlockID to Physical-BlockID, the allocation for several continuous sectors can be aggregated into one BALLOC request as $$\text{Physical-SectorID=BALLOC(ND-Physical-SectorID, SectorSize, SectorNumber, ServiceParamerSet)} \quad (8)$$

The more continuous sectors are allocated at the same storage server node, the better performance could be achieved during I/O operations since the light-path established between the server and client node could be more effectively used. However, too many continuous sectors allocated at the same server will break the natively load-balancing of the sector-based allocation in the shared storage network system and the allocation request is easier to be rejected due to insufficient resource available at the requested server node. The proper number of continuous sectors at the same server is to be negotiated between the server and the client based on the application requirement and the storage server situation.

In the following, operation modes of the shared storage network system of the invention are explained.

The block address scheme and data transmission scheme allow the system to operate in a very large scale. It is ideal for GAS to operate in the way that many nodes are attaching and detaching dynamically to access and maintain a single global virtual storage. However, this dynamic operation mode assumes that there is some route available in the optical domain between any server and client node pair, and a client is also willing to store its data into any unknown place. In order to adapt to the network infrastructure situation and the variety of the usage, there are three operation modes defined in the shared storage network system: A dynamic operation mode, a partially dynamic operation mode and a static operation mode.

The dynamic operation mode is the general operation mode of the system. A complete dynamic operation mode requires a fully adaptive routing algorithm, which can greedily find the network-wide least-cost path based on the dynamic link state and a custom-designed cost function. A commonly used adaptive routing scheme takes Dijkstra's shortest path first algorithm. To perform fully adaptive routing in a fully wavelength-convertible network, the problem is equivalent to the routing process in conventional communication networks without any buffer. However, in the event that networks have no wavelength conversion capability or are only partially wavelength-convertible, the Dijkstra's algorithm cannot be applied directly in all cases. Under disadvantageous conditions, fully adaptive routing may also suffer from the following problems. Firstly, stable link state may result in a conflict of network resources during resource reservation between two light-paths. Secondly, the flooding of the link state from every node to the whole network may congest the control plane and disturb the other signal mechanisms. Thirdly, the fully adaptive scheme can hardly take the path-based metrics into consideration, such as the potential bottleneck between a node pair and the correlation of the shared risk link group constraint. Of course the computation complexity introduced by the fully adaptive scheme is very high. In the light of the above aspects, the fully adaptive routing strategy may not practically adopted in all cases.

In partially adaptive routing, each source-destination pair is equipped with multiple alternate paths. Each source node is provided with a routing table, in which the alternate paths to all its destination are defined offline. A partially adaptive routing algorithm could enable a more practical and efficient but less flexible partially dynamic operation mode, which is similar to a static operation mode. The difference between the partially dynamic operation mode and the dynamic operation mode is that the neighbour to send a request will only be selected from those destinations listed in the routing table. The static operation mode is preferably adopted when the client node would like to manually include several server nodes in its neighbour list, e.g. for trust reasons.

Next, the block address translation server (BATS) will be described in more detail.

In additional to the storage server and client node, the BATS node is an optional component of the system. One of the important assumptions of the system of the invention is that optical connections are available between the client and server nodes as data channel for very high performance I/O data transfer. The data transfer can be directly established between the storage client and a storage server. However, this assumes that every node has a direct interface connection to the optical domain. A BATS node could be installed in a LAN as the edge node to the optical domain, e.g. as an edge router. In this case, BATS acts as an access point to the optical domain and its optical link could be shared by the nodes in its local area. Since the communication between a BATS and nodes (storage servers, storage clients) within the same LAN is a local area communication, a BATS node could natively extend any local oriented storage transmission protocol, e.g. Fiber-Channel protocol, to wide area.

Once a BATS node is installed in a LAN, it can help all the remaining server or client nodes in the LAN to talk to the remote server or client nodes. In this case, only the BATS node need a global NodeID and a public-private key pair and the rest nodes in the LAN just need a NodeID with local area significance. The way how a BATS node functions can be summarized by the following two aspects:

a local storage client and a remote storage server: Each BATS has its own virtual block address space. When a storage allocation operation is received from a remote BATS, BATS will perform a corresponding allocation operation in its local area under static operation mode with the local available servers as the only neighbour set. Once the local resource allocation succeeds, the newly active virtual block address will be returned as the allocation result to the remote BALLOC operation.

a remote storage client and a local storage server: a storage client will send its local BATS the request for attaching the physical block to its virtual block address space. Based on the virtual block address, the BATS will compute the Non-Deterministic physical address and send the storage allocation request to the corresponding remote BATS.

The data transmission scheme described in the following is one of the main aspects of the invention.

In the following, an optical stopover burst transmission scheme for the shared storage network system of the invention will be explained.

An optical burst mode flow control scheme enables the flexible sharing and high utilization of the data channel in the shared storage network system of the invention. A random eligibility time transmission method provides the QoS (Quality of Service) differentiation. Since an optical burst is transmitted just after a control packet without waiting for the acknowledgement for light-path setup, the major disadvantage for the optical burst mode flow control scheme is the existence of a burst blocking possibility at the intermediate optical nodes between a source node and a destination node. Blocking can cause the dropping and retransmission of the burst. Low-level storage protocols, e.g. SCSI-based protocols, are highly intolerant to packet loss or the long delay due to the retransmission in the optical domain. An optical stopover burst transmission scheme is proposed as an enhancement of the optical burst mode flow control scheme for the system of the invention.

In the optical stopover burst transmission scheme, once the optical path to the storage server node which grants the BAL-LOC operation has been decided, the storage server node will function as a permanent storage server and the intermediate nodes along the optical path will function as cache storage servers for the storage client node. In other words, intermediate computers along a data path between a source computer and a destination computer may act as a cache storage for temporally storing data transmitted along the data path.

A Parameter k in the ServiceParameterSet for BALLOC operation indicates that once such light path between server and client exists, at least (k−1) nodes on the path will be selected as the cache storage servers and corresponding size of storage will prepared. If k is set to zero, the number of cache storage servers will be decided by the system based on the transmission situation.

In the frame of the optical stopover burst transmission scheme, once the burst reaches any of the cache storage servers, an ACK (acknowledgement) will return to indicate the successful transmission. In case the burst is blocked at some parts of the rest journey, the cache storage server will store the burst and take over the task to deliver the data to the permanent storage server or the client node. If the immediate next node to the client or server node is prepared as a cache storage server, the storage traffic is always eligible to send just after the control packet whenever the immediate corresponding wavelength is available. By the optical stopover burst transmission scheme, the delay for waiting the light-path set-up, which is the major overhead in the optical burst transmission, could be neglected. Whenever the burst is blocked, a replica of the burst is stored in the cache storage server without simply dropping the burst and waiting for re-transmission. Such cache copy could be used for future read-head or write-back operation, and could even be used for recovery or support off-line operation when the permanent storage server is not available.

Common operations are provided in the shared storage network system of the invention, as explained in the following.

Block read/write operation may be performed. In order to get rid of the complex version control among different servers, a content-hash key, called ImageID, is used to implement updating. BlockImageID is simply derived by directly hashing the content of the block as $$\text{BlockImageID=SHA-1(BlockContent)} \quad (9)$$

In the system of the invention, the sector is the basic data unit for the I/O operation on the remote storage. The whole sector, where the addressed block locates, tends to be fetched, instead of a single block. Each sector is associated with a random generated 160-bit Version Control Code (VCC). The XOR of BlockImageID of all blocks within a sector and the VCC will be the SectorImageID of the sector. The SectorImageID will be used in each block read/write operation to verify the version. The function of VCC is to invalidate a sector for any further access for those who are holding the old VCC since the SectorImageID needs to be verified before access.

$$\text{new SectorImageID=BWRITE(data, Physical-BlockID, old SectorImageID, keys, ServiceParameterSet)} \quad (10)$$

$$\text{new SectorImageID=BREAD(data, Physical-BlockID, old SectorImageID, keys, ServiceParameterSet)} \quad (11)$$

A read/write request on a particular virtual block will result in a read/write operation on the corresponding physical block at the local buffer if the sector is available. The real operation on the remote storage server occurs in the unit of sector in case of that the corresponding sector is not available at the local buffer or the data needs to be flushed back.

In the optical burst transmission scheme which may be adopted in the system of the invention, the burst could be accumulated in the unit of sector. Based on the application requirement, when the operation on the remote storage server occurs, a number of continuous sectors could be read from or write back in one burst.

Sharing is an important aspect in the shared storage network system of the invention, as described in the following.

The shared storage network system natively supports read-only sharing. The writable sharing can be supported through some additional layer, e.g. a File System layer above the shared storage network system. An owner of a block could grant the complete read access of a sector to others by providing Physical-SectorID, SectorImageID, SectorSecretSeed, Version Control Code and a list of alternative Physical-SectorID at the cache storage server. Alternatively, an owner of a block could grant read access to a portion of a sector by providing Physical-SectorID, Sector'ImageID, a selected block offset order, and a list of alternative Physical-SectorID at a cache storage server.

Since each node has a self-generated key pair, each sector allocated at a server is associated with the owner's public-key. A sector can be updated by a write operation, in which the Physical-SectorID is encrypted by the owner's private-key. Otherwise, the sector can be read-only.

After receiving the indexing structure of a sector the read-only client will perform the version checking in turn with close servers based on the routing information. The closest storage server with the correct version is more likely to be selected for the data delivery.

Next, a read-head and write-back operation is described.

The optical burst mode transmission scheme could enable easy sharing and high utilization of the optical links. However, a disadvantage of the optical burst switching is the blocking possibility at intermediate nodes, which may lead to the burst dropping. In a storage system, the low-level storage protocols, e.g. SCSI (Small Computer System Interface), are highly intolerant to data loss and also the long delay due to the data retransmission in the optical domain.

With the storage allocation scheme of the invention, several continuous sectors will be allocated at the same storage server. During access to data from the current storage server, which usually has been prefetched to the local cache, the request to fetch those continuous sectors from the next storage server will be generated to enable read-ahead.

With the optical stopover burst transmission scheme, the blocked burst, which could contain one or more sectors, will be stored at one of the cache storage servers. Together with the read-ahead scheme, when the data is to be accessed, it is either located in the client's local cache or at a closer cache storage server.

A similar solution is used to enable write-back operation. The data update is operated and logged on the client's local cache, which is actually a persistent storage. When a proper amount of data has been ready for the burst mode transfer, it will be write-back to the remote storage server. Although the burst relay may occur at the read-ahead operation, the client will receive the acknowledgement when the burst reaches the first cache storage server.

Next, updating paths in the system of the invention is explained.

During the operation on the data at the local cache, sufficient information is logged to replay update activity. Each current active sector is associated with a replay log to record the difference σ between the local cache copy and the one at the permanent storage server. A sector replay log is identified by the old VCC and the current VCC of the sector. In order to reduce the size of the replay log, any operation that overwrites the effect of earlier operations may cancel the corresponding log records. With the optical stopover burst transmission scheme, multiple copies of data could be maintained at per-manent and cache storage servers. Any of them could be requested for the next block retrieval or update. In order to avoid the version conflict, any update on the sector will lead to an immediate VCC update on all the copies through the control channel to prevent any further access for the old version. If the size of the sector replay log is under a certain threshold, all copies of sector data can be updated by replay-ing the log to get the current VCC associated. Since all servers are located on one of the path between the source and desti-nation, the sector replay log can be integrated with the period routing information exchanging through the control channel to synchronize the data without using the data channel. Before all copies have been synchronized, the SectorImageID verification will be used to decide if request forwarding to some updated server is required or not.

In the following, Storage QoS (Quality of Service) in the system of the invention is described.

An I/O request class classification method will depend on the storage protocol employed. In case of SCSI which is the most widely deployed protocol, the initiator address, target address and logical-unit attributes of a request will be used for classification. Associated with each class/request is a QoS specification which can consist of multiple performance or availability requirement. Based on the classification, the storage differential service will be reflected in two places, burst mode data deliver and cache storage allocation.

Now, burst mode data deliver will be explained.

The burst mode flow control method natively supports different responding time and burst blocking possibility by setting the burst eligibility time differently. The different service level requirement from each class/request will be provided by a random eligibility time transmission scheme. Higher priority class/request will usually have shorter burst accumulated for burst relay during read-ahead/write-back operation, which leads to faster responding time and less stop-over.

Next, cache storage allocation will be described.

The storage at the cache storage servers is shared among those storage clients that have a route passing through such server. With read-ahead scheme enabled, while the storage client is served by the current storage server, the next storage server holding the data to be sequentially accessed will continuously provide the data in advance till either any further notification from the client to stop the transmission or the local and intermediate cache servers are out of storage. If more storage is allocated for a client at the cache storage server, more data is possible to be read-ahead, which will lead to fast response time. During the write-back operation, larger storage allocated at cache storage server will absorb an imme-diate updating operation, which will also lead to fast response time. Even in the situation that the lightpath to the permanent storage server is temporarily not available, if the cache storage server still maintains the corresponding blocks, the storage client will not be aware of any storage loss.

Since the storage at the cache storage servers is shared, based on the QoS requirement associated with each request/class, some initial storage usage upper boundary will be set. Within the boundary, storage will be provided by listening to the BALLOC operation to the permanent storage server. Beyond that boundary, the LRU (least recently used) replacement is employed for each client. The QoS requirement will be monitored based on the history recorded, more storage will be allocated if the service requirement cannot be met.

Further, an information base for the shared storage network system of the invention may be provided.

In the following, an example for a Virtual Block Address Table is given:

```
Struct Sector {
    ActiveBit; //1-bit
    VirtualSectorID; //lg[2^160/SectorSize] bit
    SectorImageID;
    VersionControlCode;
    Physical_SectorID_IP_addr;
    Physical_SectorID_Remote_Sector_Base_Addr;
    SectorSecretSeed; //Used during the PhsysicalOffset caculation
}
```

The Virtual Block Address Table is organized in the unit of a sector. Depending on the SectorSize, the whole table consists of $\log[2^{160}/\text{SectorSize}]$ entries, which can be implemented as an array. The length of SectorID and SectorOffset depends on SectorSize.

Given a Virtual Block Address, the VirtaulSectorID portion will be used as the index to access the address table. If this virtual sector is not active yet, a BALJOC request will be generated, otherwise the secure hashing result on the VirtalSectorOffset portion and the content in the current table entry is sufficient to perform any operation on the indicated virtual block.

If the BATS node implementation in case of a direct communication between a storage server and a storage client is not possible or not preferred, a Virtual Block Address Table is maintained at BATS with all the physical blocked attached being collected from the storage server within local area. Such address table will be used to answer the operation request from remote clients. If all the data transfer need go through BATS, the Virtual Block Address Table can be maintained at a BATS.

In this specification, the following documents are cited:

[1] J. Kubiatowicz, D. Bindel, Y. Chen, S. Czerwinski, P. Eaton, D. Geels, R. Gummadi, S. Rhea, H. Weatherspoon, W. Weimer, C. Wells, and B. Zhao, "OceanStore: An architecture for global-scale persistent storage" In: Proceedings of the Ninth international Conference on Architectural Support for Programming Languages and Operating Systems (ASPLOS 2000), Boston, Mass., 2000, pp. 190-201

[2] A. Rowstron and P. Druschel, "Storage management and caching in PAST, a large-scale, persistent peer-to-peer storage utility" 18th ACM SOSP'01, Lake Louise, Alberta, Canada, 2001

[3] Ion Stoica, Robert Morris, David Karger, M. Frans Kaashoek, and Hari Balakrishnan, "Chord: A Scalable Peer-to-peer Lookup Service for Internet Applications" ACM SIGCOMM 2001, San Diego, Calif., 2001, pp. 149-160

[4] SNIA Technical Council, "Shared Storage Model", SNIA TC Proposal Document, 2001

REFERENCE SIGNS

100 SNIA layer model
101 layer I
102 layer II
103 layer III
104 layer IV
200 shared storage network system
201 first storage server
202 second storage server
203 storage portion
204 sectors
205 blocks
206 first storage client
207 second storage client
208 first local area network
209 second local area network
210 third local area network
211 optical network
212 first linking computer
213 second linking computer
300 shared storage network system
301 first storage server
302 second storage server
303 storage client
304 linking computer
305 optical domain network
306 local area network
400 optical data path
401 storage client
402 storage server
403 intermediate cache server computers
404 optical network

What is claimed is:

1. A shared storage network system, comprising
a plurality of storage servers, each providing a storage portion of the shared storage network system, each storage portion being divided into a plurality of sectors, each sector being divided into a plurality of blocks, a virtual block identifier being associated to each of the blocks such that the entirety of all of the virtual block identifiers of the blocks form a global block address space in which each of the virtual block identifiers is unique;
at least one storage client;
wherein
the plurality of storage servers and the at least one storage client are grouped into a plurality of local area networks interconnected to form a global network;
the at least one storage client is adapted to have read and/or write access to at least one block of at least one of the storage portions associated to one of the local area networks which differs from the local area network of the storage client;
the plurality of local area networks are interconnected such that in case of a read or a write access of one of the at least one storage client to at least one of the blocks, the virtual block address of a block to which access is desired is translated into a physical block address to identify the physical block associated with the virtual block; and
the shared network system is adapted such that the physical block address of each block comprises a non-deterministic physical block address to address the unique physical block mapping to a particular virtual block associated with a particular virtual block identifier, and a deterministic physical block address to address a unique physical block in the global network to determine the location of the associated physical block.

2. The shared storage network system according to claim 1, wherein the global network is an optical network.

3. The shared storage network system according to claim 1, wherein at least one of the local area networks comprises a linking computer being interconnected as a link between the at least one storage server and/or the at least one storage client of the local area network associated with the linking computer on the one hand and the remaining local area networks on the other hand.

4. The shared storage network system according to claim 3, wherein the linking computer is adapted to perform the translation of a virtual block address of a block to which access is desired into the physical block address of this block.

5. The shared storage network system according to claim 1, wherein at least one of the local area networks is an optical network or a wired network.

6. The shared storage network system according to claim 1, which is adapted to operate based on the Storage Networking Industry Association standard.

7. The shared storage network system according to claim 3, wherein a unique computer identifier is associated to each storage server and/or to each storage client and/or to each linking computer of each of the local area networks.

8. The shared storage network system according to claim 7, wherein the unique computer identifier is determined as a hash.

9. The shared storage network system according to claim 7, wherein the unique computer identifier is determined as a cryptographic hash.

10. The shared storage network system according to claim 8, wherein the hash is based on the internet protocol address of the computer and on a private key.

11. The shared storage network system according to claim 1, which is adapted such that a temporally varying attachment and detachment of storage servers and/or storage clients to the shared storage network system is enabled.

12. The shared storage network system according to claim 1, which is adapted such that routing, in case of a read or a write access communication between a storage client and a storage server, is implemented by a fully adaptive routing scheme adapted to find a global network-wide least-cost path.

13. The shared storage network system according to claim 12, wherein the global network-wide least-cost path is determined based on a dynamic link state and/or a custom-designed cost function.

14. The shared storage network system according to claim 1, which is adapted such that routing, in case of a read or a write access communication between a storage client and a storage server, is implemented by a partially adaptive routing scheme, according to which a plurality of alternate paths between a pair of a storage client and a storage server are stored in a routing table at the storage client and/or the storage server.

15. The shared storage network system according to claim 1, which is adapted such that routing, in case of a read or a write access communication between a storage client and a storage server, is implemented by a static adaptive routing scheme, according to which one or more fixed alternate paths between a pair constituted by a storage client and a storage server are stored at the storage client and/or the storage server.

16. The shared storage network system according to claim 1, which is adapted such that, in case of a predetermined global network path for a read or a write access communication between a storage client and a storage server, one or more other storage clients and/or storage servers along said path are implemented as cache storage nodes for temporarily storing data transmitted according to the read or write access.

17. The shared storage network system according to claim 1, which is adapted to implement a storage data transmission scheme comprising an optical burst mode flow control and an optical stop-over burst transmission method.

18. A method for operating a shared storage network system, the shared storage network system comprising a plurality of storage servers, each providing a storage portion of the shared storage network system, each storage portion being divided into a plurality of sectors, each sector being divided into a plurality of blocks, a virtual block identifier being associated to each of the blocks such that the entirety of all of the virtual block identifiers of the blocks form a global block address space in which each of the virtual block identifiers is unique;

at least one storage client;

a plurality of local area networks, wherein the plurality of storage servers and the at least one storage client are grouped into the plurality of local area networks interconnected to form a global network;

the method comprising the steps of:

adapting the at least one storage client to have read and/or write access to at least one block of at least one of the storage portions associated to one of the local area networks which differs from the local area network of the storage client;

interconnecting the plurality of local area networks such that in case of a read or a write access of one of the at least one storage client to at least one of the blocks, the virtual block address of a block to which access is desired is translated into a physical block address to identify the physical block associated with the virtual block; and adapting the shared storage network system such that the physical block address of each block comprises a non-deterministic physical block address to address the unique physical block mapping to a particular virtual block associated with a particular virtual block identifier, and a deterministic physical block address to address a unique physical block in the global network to determine the location of the associated physical block.

19. The shared storage network system according to claim 9, wherein the hash is based on the internet protocol address of the computer and on a private key.

* * * * *